(12) United States Patent
He (10) Patent No.: US 8,500,024 B2
(45) Date of Patent: Aug. 6, 2013

(54) METHODS AND APPARATUS FOR PROVIDING USER FEEDBACK DURING IMAGE CAPTURE

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/872,100

(22) Filed: Aug. 31, 2010

(65) Prior Publication Data

US 2012/0048938 A1    Mar. 1, 2012

(51) Int. Cl.
  *G03B 7/08*    (2006.01)
(52) U.S. Cl.
  USPC .............. 235/462.24; 235/454; 235/462.11; 235/462.41
(58) Field of Classification Search
  USPC ................................... 235/462.11, 462.24
  See application file for complete search history.

(56) References Cited

U.S. PATENT DOCUMENTS

| 5,949,057 | A  | * | 9/1999 | Feng ................ 235/472.01 |
| 7,627,535 | B2 | * | 12/2009 | Brockman et al. ........... 705/404 |
| 2003/0142855 | A1 | * | 7/2003 | Kuo et al. .................... 382/119 |
| 2004/0094627 | A1 | | 5/2004 | Parker et al. |
| 2007/0228171 | A1 | | 10/2007 | Thiyagarajah |
| 2008/0023552 | A1 | | 1/2008 | Gillet et al. |
| 2008/0073434 | A1 | * | 3/2008 | Epshteyn et al. ........... 235/454 |
| 2010/0044445 | A1 | | 2/2010 | Kiliccote |
| 2010/0289915 | A1 | * | 11/2010 | Wang ....................... 348/222.1 |

OTHER PUBLICATIONS

International Search Report and Written Opinion dated Feb. 9, 2012 in related case PCT/US2011/047564.

* cited by examiner

*Primary Examiner* — Kristy A Haupt (57) ABSTRACT

A data capture device is described. The data capture device includes an imager simultaneously capturing a barcode and an image associated with the barcode. A memory is coupled to the imager for storing the barcode and the image. A processor is coupled to the memory for decoding the barcode and processing the image. A notification system notifies a user that the image is being processed prior to the processor completing the processing of the image.

15 Claims, 5 Drawing Sheets

METHODS AND APPARATUS FOR PROVIDING USER FEEDBACK DURING IMAGE CAPTURE

TECHNICAL FIELD

The invention relates generally to imager-based barcode scanning and providing user feedback during image capture.

BACKGROUND

Mobile computers having imager-based barcode capture devices are becoming widespread. When capturing an image, some of these image-based devices use a decoded barcode as a ruler and capture an area of interest from an image that includes the barcode. The area of interest is then processed to remove capture artifacts. The processed image is then generally displayed to the user on the display of the mobile computer. The time required to process the area of interest can be significant and can cause the user to assume that the system is not functioning properly.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

SUMMARY

In one aspect, the invention is embodied in a data capture device having an imager for simultaneously capturing a barcode and an image associated with the barcode. The data capture device also includes a memory coupled to the imager for storing the barcode and the image. A processor is coupled to the memory. The processor decodes the barcode and processes the image. A notification system notifies a user that the image is being processed prior to the processor completing the processing of the image.

The processing can include removing image skew, improving image contrast, and/or balancing illumination across the image. In some embodiments, the notification system can include a display, a light emitting diode (LED), and/or a loudspeaker. The data capture device can be integrated with a mobile computing device.

In one embodiment, the notification system includes a display that displays the image in low resolution prior to the processor completing the processing of the image. In one embodiment, a period of time between capturing the image and processing the image is greater than fifty milliseconds. The processor can decode the barcode and can process the image substantially sequentially. The barcode includes position information about the image.

In another aspect, the invention is embodied in a method for notifying a user that an image is being processed. The method includes capturing a barcode and an image associated with the barcode. The barcode and the image are then stored. The barcode is then decoded. The image corresponding to the barcode is then processed. A user is then notified that the image is being processed prior to completing the processing of the image.

In some embodiments, the processing can include removing image skew, improving image contrast, and/or balancing illumination across the image. The user can be notified using a display, a light emitting diode (LED), and/or a loudspeaker. The image can be captured with an imager. In one embodiment, the user is notified via a display that displays the image in low resolution prior to completing the processing of the image. The image can be displayed in low resolution prior to completing the processing of the image.

In one embodiment, an audible signal can be provided to the user prior to completing the processing of the image. In one embodiment, the period of time between capturing the image and processing the image is greater than fifty milliseconds. In one embodiment, the barcode is decoded and the image is processed substantially sequentially. The barcode can include position information about the image.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional image-based capture, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to systems utilizing imagers. In an exemplary embodiment, an imager is integrated into a data capture device, such as a scanner or a mobile computer. The imager included with the data capture device captures a barcode and an image that corresponds to the barcode. A notification system is described that provides feedback to the user when the image is being processed.

Figure 1:
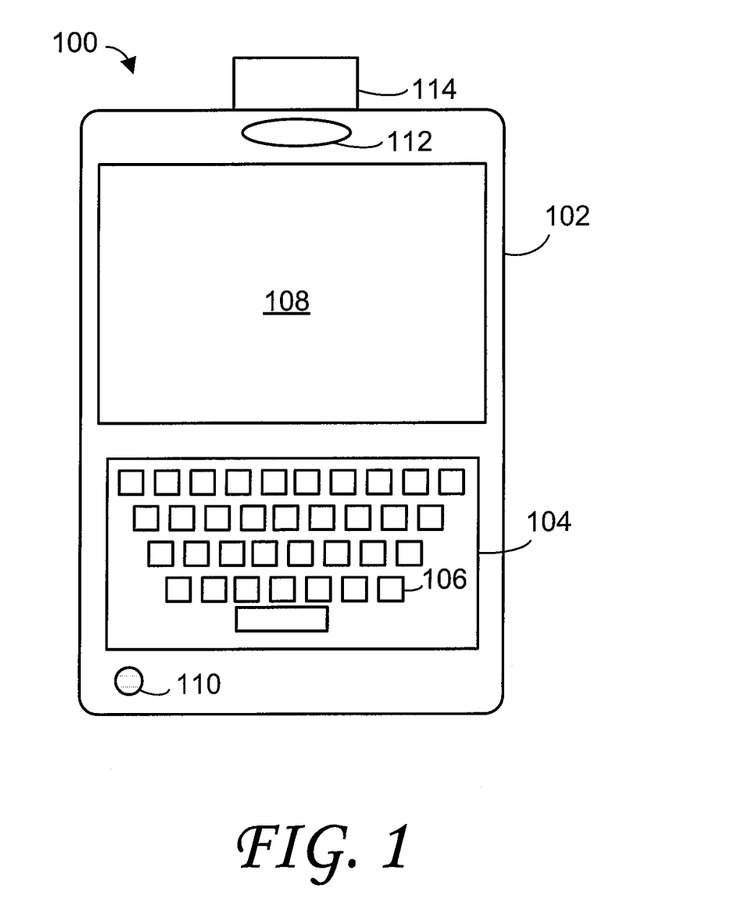
FIG. 1 is a front view of a mobile computing device according to one embodiment of the invention.

FIG. 1 is a front view of a mobile computing device 100 according to one embodiment of the invention. The mobile computing device 100 is one example of a data capture device having an imager according to the invention. The mobile computing device 100 includes a housing 102. The housing 102 contains electronic components, including internal communication components and circuitry as further described with relation to FIG. 2 to enable the device 100 to communicate wirelessly with other devices. The housing 102 also contains I/O devices such as a keyboard 104 with alphanumeric keys 106, a display 108 (e.g., LED, OELD) that displays information about the device 100, soft and/or hard keys, touch screen, jog wheel, a microphone 110, and a speaker 112. The mobile computing device 100 can also include an imager-based data capture device 114, or imager, such as a charged coupled device (CCD) or complementary metal-oxide-semiconductor (CMOS) sensor array, for capturing an image located in a field of view of the imager-based data capture device 114. In some embodiments, the device 100 includes more or less than all of the I/O devices shown in FIG. 1.

Figure 2:
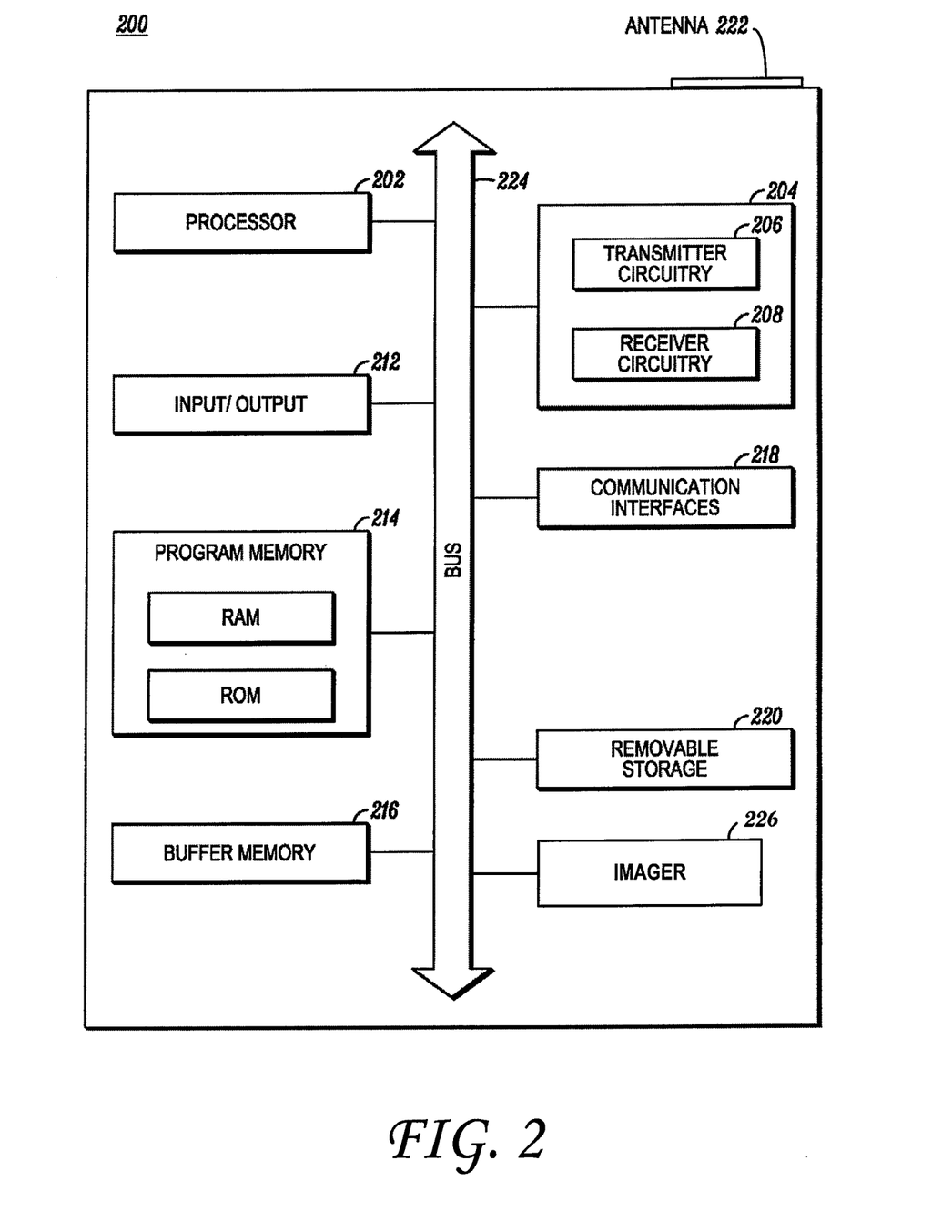
FIG. 2 is a block diagram illustrating the electronic components of the mobile computing device of FIG. 1.

FIG. 2 is a block diagram 200 illustrating the electronic components of the mobile computing device 100 (FIG. 1) according to the invention. The mobile computing device 100 contains, among other components, a processor 202, a transceiver 204 including transmitter circuitry 206 and receiver circuitry 208, an antenna 222, the I/O devices 212 described in relation to FIG. 1, a program memory 214 for storing operating instructions that are executed by the processor 202, a buffer memory 216, one or more communication interfaces 218, a data capture device 226, and an optional removable storage 220. The mobile computing device 100 is preferably an integrated unit containing the elements depicted in FIG. 2, as well as any other element necessary for the mobile computing device 100 to function. In one embodiment, the electronic components are connected by a bus 224.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the mobile computing device 100 are described in detail below.

The transmitter circuitry 206 and the receiver circuitry 208 enable the mobile computing device 100 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the mobile computing device 100 and the devices with which it is to communicate. For example, the transmitter and receiver circuitry 206, 208 can be implemented as part of the communication device hardware and software architecture in accordance with known techniques. One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. In one embodiment, the antenna 222 is a local area network (LAN) antenna coupled to the transceiver 204.

The buffer memory 216 may be any form of volatile memory, such as RAM, and is used for temporarily storing information received from the data capture device 226, for example. The removable memory 220 can be a secure digital (SD) memory card, for example.

The imager 226 is controlled by the processor 202. The processor 202 issues capture commands to the imager 225 via the program memory 214. In one embodiment, the program memory 214 is implemented within a field programmable gate array (FPGA), however the program memory 214 may also be implemented in other devices. The imager 225 captures images and the program memory 214 stores the images in a memory module. The memory module stores the image data prior to the processor 202 processing the image or displaying the image on a display 108 (FIG. 1), such as liquid crystal display (LCD).

A typical imager captures thirty frames per second or one frame every thirty-three milliseconds. This is commonly referred to as the image capture cycle (i.e. the time required for the imager to expose the image and transmit the data to memory). Thus, the image capture cycle is thirty-three milliseconds, meaning that once every thirty-three milliseconds the imager exposes a new frame and sends the image to memory.

In operation, the imager 226 captures an image by exposing the image and directing the image to the program memory 214. This process begins when the processor 202 issues a command instructing the imager 226 to capture an image. Once the image including the associated barcode is captured, the image undergoes time consuming processing prior to displaying the image to the user. The processing can include finding and decoding the barcode, using the barcode's parameters (its four corners' locations within the image, for example), and other predefined parameters associated with the specification of the capture area, determining the four corners of the image capture area (generally not forming a rectangle in the image, due to perspective distortion), enhancing the image and reformatting the image. Enhancing the image can include adjusting the contrast of the image, adjusting the skew of the image, adjusting the illumination, or sharpening the image. In one embodiment, the enhancements can be achieved by implementing a filtering scheme. Also, reformatting can include adjusting the size of the image or compressing the pixel density. In some embodiments, the time for processing can exceed fifty milliseconds. After the processing is completed, the image is displayed and/or transmitted to a host computer.

Figure 3:
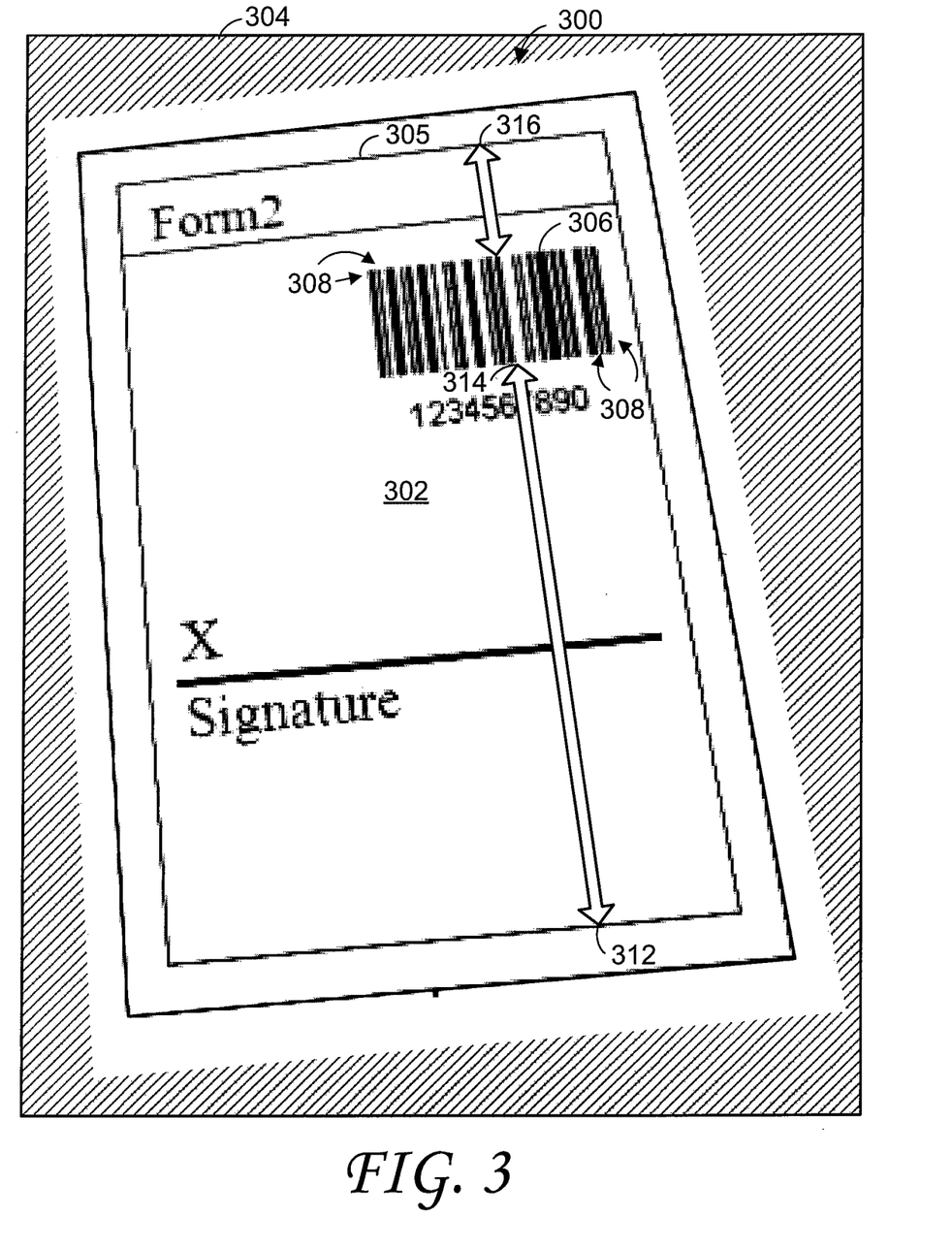
FIG. 3 is an example of a document for use with the data capture device of the present invention.

FIG. 3 is an example of a document 300 for use with the data capture device of the present invention. For example, the document 300 can include a data form 302 suitable for capturing. The user captures an image 304 of a document 300, for example, using the mobile computing device 100 (FIG. 1). The document 300 includes an image 305 of the data form 302 and an associated barcode 306.

The barcode 306 is generally used to provide position and dimensional information about the image 305 associated with the barcode 306. The barcode 306 is captured and decoded to generate the position and dimensional information about the image 305. In one embodiment, the boundaries 308 of the barcode 306 are used as a reference to determine the position and coordinates of the image 305. For example, predefined parameters (specified by the user prior to the decoding session) can indicate that the image 305 has lower boundary 312 that is 5 times the height of the barcode 306 below the bottom 314 of the barcode 306, and similarly specified but different values for the upper boundary 316 of the image 305, etc.

Figure 4:
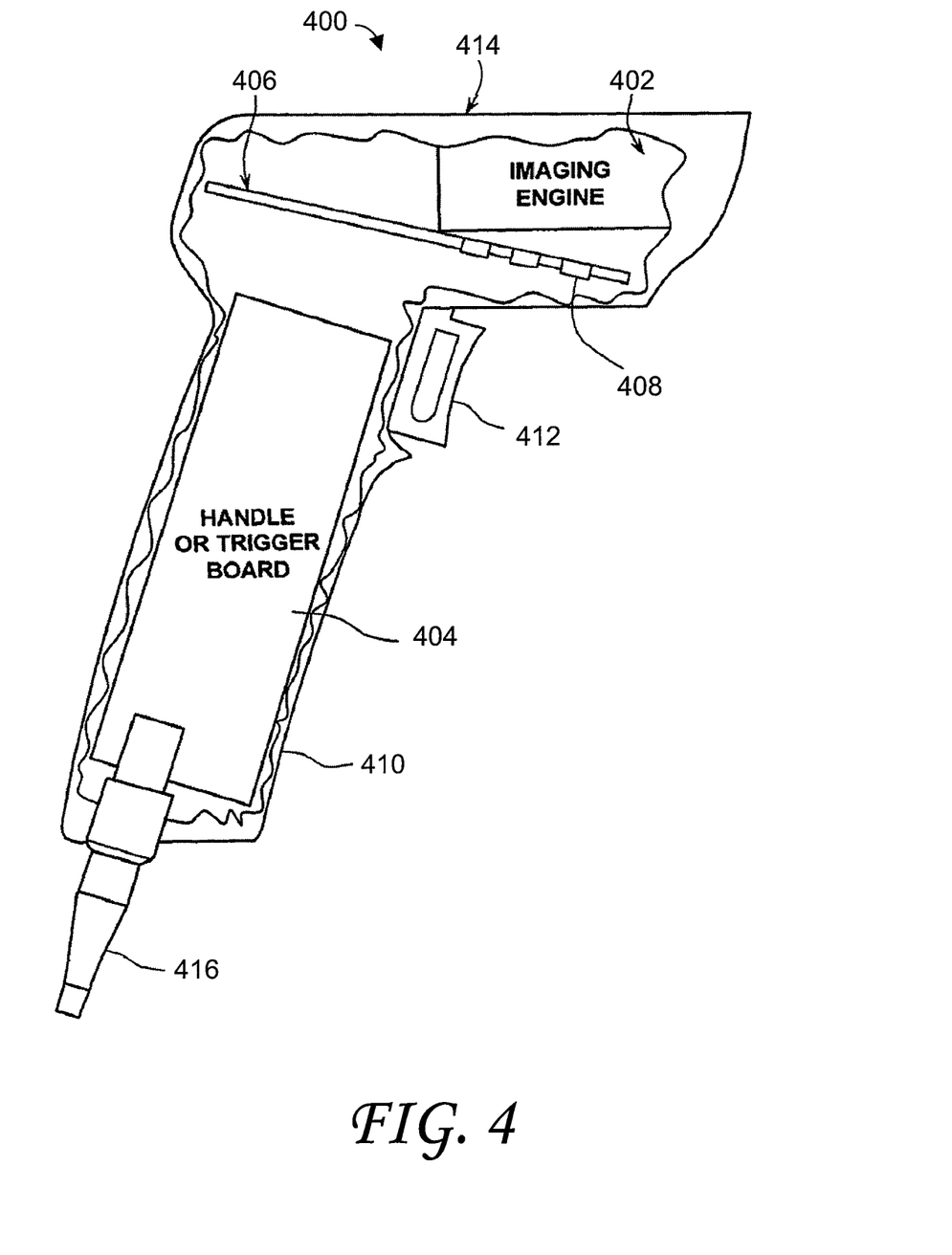
FIG. 4 is a cross-sectional view of a scanner according to one embodiment of the invention.

FIG. 4 is a cross-sectional view of a scanner 400 according to one embodiment of the invention. The scanner 400 can include an imaging engine 402, a trigger board 404, and a control and a logic circuit (CLC) board 406 having at least one processor 408. In one embodiment, the trigger board 404 is located in a handle portion 410 of the scanner 400. The trigger board 404 is electrically associated or connected with the trigger switch 412 of the scanner 400 in order to initiate a image/barcode decode procedure upon a user pressing the trigger switch 412. The CLC board 405, or portions thereof, may alternatively be provided externally from the scanner 400, such as in a host terminal (not shown).

The scanner can also include an illumination system (not shown) having a plurality of light emitting diodes (LEDs) (not shown). The imaging engine 402 can be encased within a housing 414 of the scanner 400. The imaging engine 402 can include a lens assembly and a sensor array, such as a charged coupled device (CCD) or complementary metal-oxide-semiconductor (CMOS) sensor array, for capturing an image located in a field of view of the imaging engine 402 upon activation of the trigger switch 412 and the illumination system. The sensor array can be a two-dimensional sensor array as used in two-dimensional imaging systems.

The scanner 400 can further includes an aiming system (not shown) having a plurality of LEDs (or a laser beam system) for projecting an aiming pattern onto the field of view for aiding in properly positioning the image in the field of view of the scanner 400.

The processor 408 executes algorithms corresponding to various barcode symbologies. For example, the processor 408 utilizes one of the algorithms for decoding the barcode associated with the image as known in the art. The processor 408 further executes a set of programmable instructions for turning on the LEDs of the illumination system upon activation of the trigger switch 412 and for blinking at least one LED or all the LEDs of the illumination and/or aiming system by turning them off and on one time or several times whenever the processor 408 successfully decodes the barcode and captures the image. The processor 408 can further turn on and off one time or several times the laser beam system projecting a laser beam of the aiming system whenever the processor 408 successfully decodes the barcode. In one embodiment, the act of blinking at least one LED or all the LEDs of the illumination and/or aiming system or the projected laser beam one time or several times provides a visual indication to a user of a successful decode.

A flexible electrical cable 416 is provided to connect the scanner 400 to a host terminal (not shown). In alternative embodiments, the cable 416 may also provide electrical power to the imaging engine 402. In a further alternative embodiment, the cable 416 can be partially or fully replaced by a wireless communication technology such as radio frequency, optical or cellular communication technologies.

The host terminal (not shown) includes at least one data processor, where the data processor can be connected to one or more peripherals or computing devices, such as a video monitor, and/or a network. Processed image data can be transmitted to the host terminal over the electrical cable 416. The transmission of video data may be triggered by pressing the trigger switch 412 or by actuating another switch on the scanner 400. The image data can be transmitted to a serial communication port of the host terminal such as the serial communication port of a personal computer (PC) when such a device is used as the host terminal. In one embodiment, the image data may be at least partially processed by a data processor within the personal computer and selectively displayed on a display.

Figure 5:
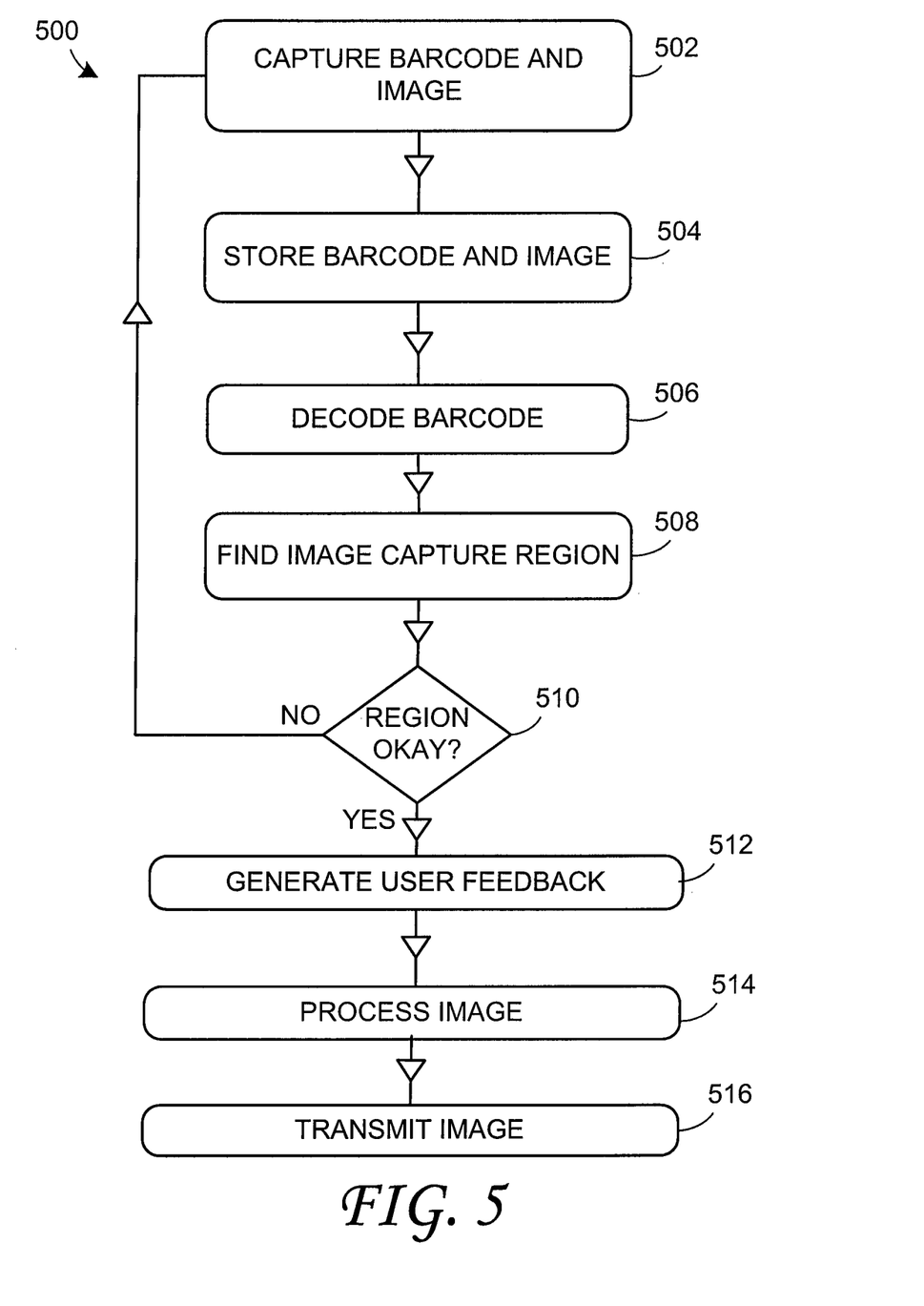
FIG. 5 illustrates a flowchart of a method for capturing an image according to one embodiment of the invention.

FIG. 5 illustrates a flowchart 500 of a method for capturing an image according to one embodiment of the invention. The method includes capturing a barcode and an image associated with the barcode (step 502). As previously described, the barcode and image are captured using a data capture device.

In step 504, the barcode and the image are stored in a memory. The barcode is decoded in step 506. The decoded barcode provides position information, as well as dimensional information about the image. A software program executing on the processor receives the position and dimensional information about the image and determines size and location of the image capture region (step 508).

In step 510, if the program determines that the data capture device did not capture the entire image capture region, the program instructs the processor to recapture the barcode and image (step 502). If the program determines that the data capture device did capture the entire image capture region, such as by determining that the four corners of the capture region are all within the captured image, the program instructs the processor to generate user feedback (step 512) to notify the user that the image is being processed. The user feedback is generated prior to the processor completing any processing of the image (step 514). The image can be transmitted to a host terminal (step 516) when the processing of the image is competed.

The processing of the image can include removing image skew, improving image contrast and balance illumination across the image. In one embodiment, the user feedback can include a visual or audible notification to the user that the image is being processed. For example, the user can be notified through a display, a light emitting diode (LED), through a loudspeaker, or a combination of these elements. In one embodiment, the user can be notified that the image is being processed by displaying the image in low-resolution prior to completing the processing of the image. In another example, the user can be notified that the image is being processed through an audible signal.

In general, the processor includes processing logic configured to carry out the functions, techniques, and processing tasks associated with the operation of the data capture device. Furthermore, the steps of a method or algorithm described in connection with the embodiments disclosed herein may be embodied directly in hardware, in firmware, in a software module executed by the processor, or any combination thereof. Any such software may be implemented as low level instructions (assembly code, machine code, etc.) or as higher-level interpreted or compiled software code (e.g., C, C++, Objective-C, Java, Python, etc.).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions, (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A data capture device comprising:
   an imager capturing an image;
   a memory coupled to the imager for storing the captured image;
   a processor coupled to the memory for processing the captured image;
   a notification system notifying a user that the captured image is being processed by displaying the captured image at a low resolution prior to the processor completing the processing of the captured image; and
   a display notifying the user that the captured image is processed by displaying the processed image on the display at a resolution higher than the low resolution.

2. The data capture device of claim 1 wherein the processing includes at least one of removing image skew, improving image contrast, and balancing illumination across the captured image.

3. The data capture device of claim 1 wherein the notification system comprises the display and at least one of a light emitting diode (LED) and a loudspeaker.

4. The data capture device of claim 1 wherein the data capture device comprises a mobile computing device.

5. The data capture device of claim 1 wherein a period of time between capturing the image and processing the captured image is greater than fifty milliseconds.

6. The data capture device of claim 1 wherein the processing the captured image comprises determining position information about the image.

7. A method comprising:
   capturing an image;
   storing the captured image;
   processing the captured image;
   notifying a user that the captured image is being processed by displaying the captured image at a low resolution prior to completing the processing of the captured image; and
   notifying the user that the captured image is processed by displaying the processed image on a display at a resolution higher than the low resolution.

8. The method of claim 7 wherein the processing includes at least one of removing image skew, improving image contrast, and balancing illumination across the captured image.

9. The method of claim 7 wherein the user is notified via the display and at least one of a light emitting diode (LED), and a loudspeaker.

10. The method of claim 7 wherein the captured image is captured with an imager.

11. The method of claim 7 further comprising providing an audible signal prior to the completing the processing of the captured image.

12. The method of claim 7 wherein a period of time between capturing the image and processing the captured image is greater than fifty milliseconds.

13. The method of claim 7 wherein the processing the captured image comprising determining position information about the image.

14. A data capture device comprising:
   means for capturing an image;
   means for storing the captured image;
   means for processing the captured image;
   means for notifying a user that the captured image is being processed by displaying the captured image at a low resolution prior to completing the processing of the captured image; and
   means for notifying the user that the captured image is processed by displaying the processed image on a display at a resolution higher than the low resolution.

15. The data capture device of claim 14 wherein the means for notifying a user comprises the display and at least one of a light emitting diode (LED), and a loudspeaker.

* * * * *